(No Model.)　　　　　　　　　　　　　　　　　　　　　　2 Sheets—Sheet 1.
C. BOLLINGER.
BROADCAST SEED SOWER.
No. 502,604.　　　　　　　　　　　　　Patented Aug. 1, 1893.
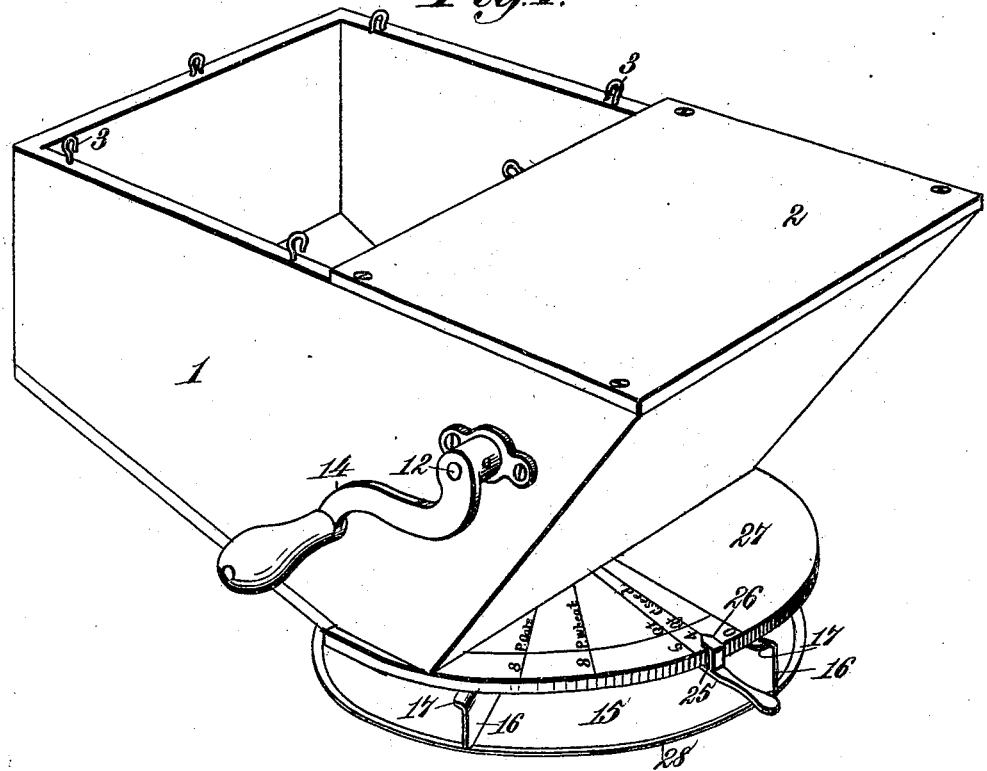
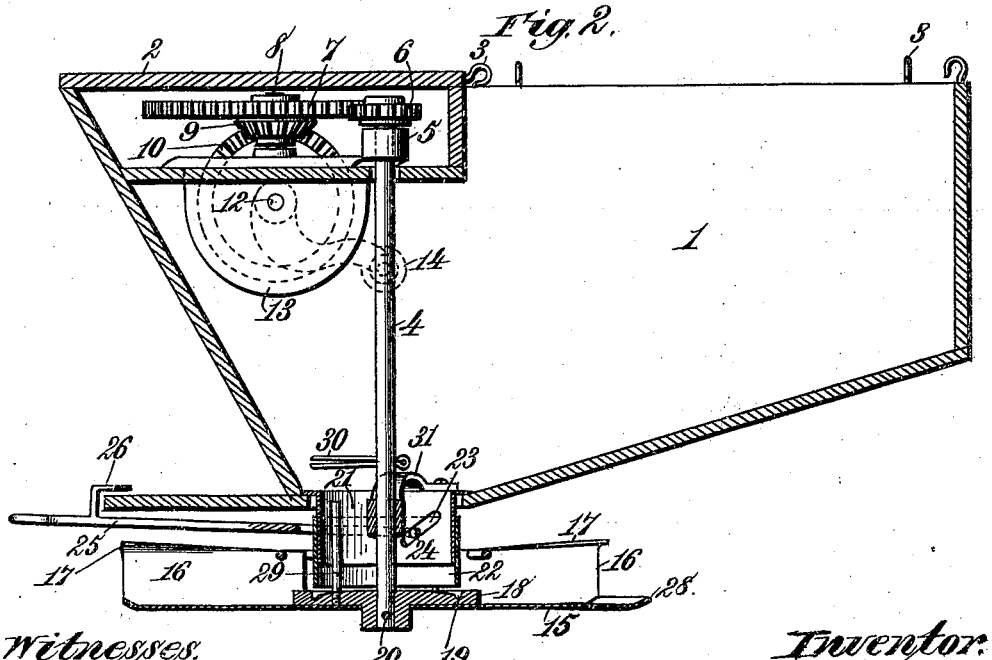
Witnesses.
Robert Everett,
A. H. Norris.
Inventor.
Cornelius Bollinger,
By Munn & Norris,
Atty.

(No Model.) 2 Sheets—Sheet 2.

C. BOLLINGER.
BROADCAST SEED SOWER.

No. 502,604. Patented Aug. 1, 1893.

Witnesses.
Robert Everett,
A. H. Norris.

Inventor:
Cornelius Bollinger.
By
James L. Norris.
Atty.

UNITED STATES PATENT OFFICE.

CORNELIUS BOLLINGER, OF HARRISBURG, PENNSYLVANIA.

BROADCAST SEED-SOWER.

SPECIFICATION forming part of Letters Patent No. 502,604, dated August 1, 1893.

Application filed March 9, 1893. Serial No. 465,282. (No model.)

*To all whom it may concern:*

Be it known that I, CORNELIUS BOLLINGER, a citizen of the United States, residing at Harrisburg, in the county of Dauphin and State of Pennsylvania, have invented new and useful Improvements in Broadcast Seed-Sowers, of which the following is a specification.

This invention has for its object to provide a new and improved machine designed to be carried by a person walking in the field and manually operated to uniformly distribute seed by centrifugal force.

The invention also has for its object to provide a novel broad cast seeding machine wherein the seed is distributed by centrifugal force from a horizontally revolving disk or plate and the quantity of seed delivered to the disk or plate is controllable at will through the medium of a handle or lever, whereby any desired quantity of seed can be distributed on the soil as the occasion may demand.

The invention also has for its object to provide a novel cut-off, which is adjustable for controlling the quantity of seed delivered from a hopper or box to a seed distributer.

The invention also has for its object to provide novel devices for connecting the mouth of a seed bag with the hopper or box for keeping the latter supplied.

To accomplish these objects my invention involves the features of construction and the combination or arrangement of parts hereinafter described and claimed, reference being made to the accompanying drawings, in which—

Figure 3:
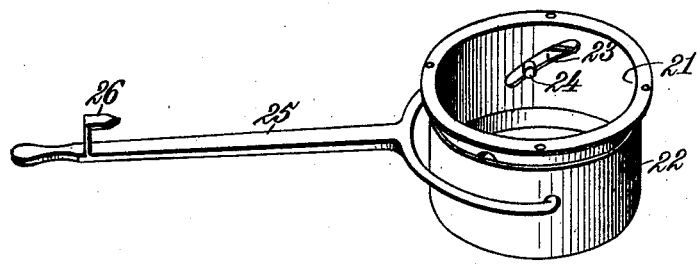
Figure 4:
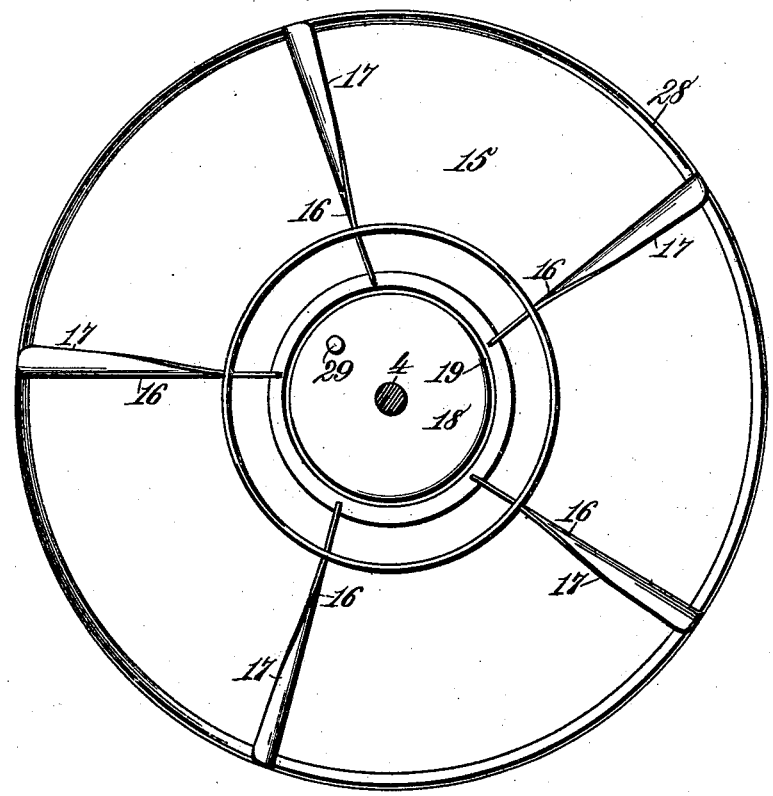

Figure 1, is a perspective view of my improved broad-cast seeding machine. Fig. 2, is a vertical central sectional view of the same. Fig. 3, is a detail perspective view of the adjustable cut-off and its operating lever, and Fig. 4, is a plan view of the rotary seed distributing disk or plate.

In order to enable those skilled in the art to make and use my invention I will now describe the same in detail, referring to the drawings wherein—

The numeral 1, indicates a hopper or box of any desired form or shape and constructed in any suitable manner so that it may receive and contain a quantity of seed which is to be distributed or planted in a field. As here shown, the hopper or box comprises side and end walls and a housing or casing 2 for covering and guarding the gearing by which a rotary seed distributing disk or plate is operated as will hereinafter appear. The top edge of the hopper or box is provided with a series of hooks 3, adapted to be turned or rotated so that all may be caused to assume the position represented in Fig. 1, for the purpose of engaging the mouth of a bag which contains the seed to be delivered to the hopper or box.

In practice, the hopper or box is preferably supported by a band or strap (not shown) suitably engaged with the hopper or box and passing round the neck of a person who walks in the field to distribute the seed. The seed bag is thrown across one shoulder and the mouth of the bag being engaged with the hooks, aids in supporting the hopper or box. The object of making the hooks rotatable is that they may be turned so that the points of the hooks stand above the top edge of the hopper or box and are thus shielded to avoid entanglement with clothing, &c. The hopper or box comprises an inclined bottom wall and one inclined end wall and in the hopper or box is journaled a vertical shaft 4, having its upper end extending into the housing or casing 2, and supported by a suitable bearing or bracket 5. The upper end of the shaft is provided with a pinion 6, engaging a gear wheel 7, mounted on a shaft 8, and rigidly connected with a bevel gear 9, which meshes with a bevel gear 10, mounted on a horizontal shaft 12. The bevel gear 10 is covered by a cap or housing 13, at a point below the housing or casing 2, and the shaft 12 projects to the exterior of the hopper or box where it is provided with a suitable crank or other handle 14, in such manner that the right hand of the operator can be utilized to turn the crank or handle and thus impart a rapid revolving motion to the vertical shaft 4. The lower end portion of the vertical shaft projects from the bottom of the hopper or box and is rigidly secured to a horizontal seed distributing disk or plate 15, having on its upper side a series of radial blades 16, the top edges of which are bent or turned laterally to form overhanging flanges 17.

The seed distributing disk 15 may be composed of sheet metal and in this event it is provided at its center with a cast metal or other suitable metallic plate 18, preferably circular in form and having an annular groove 19, in proximity to its periphery. The cast iron or other metal disk 18 is rigidly secured to the sheet metal disk 15, and the lower end of the vertical shaft 4 is attached to the cast iron or other metal plate by a pin 20, which is susceptible of being removed for the purpose of detaching the distributer disk if occasion should demand.

The hopper or box is placed in communication with the seed distributing disk through the medium of a cut-off composed of telescopic tubular sections 21 and 22. The upper tubular section 21 is rigidly secured to the hopper or box and is provided with oblique or inclined slots 23, into which project pins 24, secured to the lower tubular section 22, in such manner that by turning the lower tubular section in the proper direction it is raised or lowered for the purpose of varying the distance of its bottom edge with relation to the rotary seed distributing disk. The lower tubular section 22 is connected with a bifurcated handle or lever 25, having an index 26 to co-operate with a scale on a semi-circular plate 27, projecting from the bottom of the hopper or box as will be clearly understood by reference to Fig. 1.

The scale on the plate 27 is so graduated as to indicate the quantity of seed to be distributed on a certain piece of land, the construction being such that by moving the handle or lever 25 in the proper direction until the index or finger 26 registers with that part of the scale indicating the desired quantity, the bottom edge of the adjustable section 22 of the cut-off will lie in the proper relation to the seed distributing disk 15 to permit the requisite quantity of seed to flow upon the distributing disk.

The periphery or margin of the seed distributing disk 15 is bent or constructed to form an up-turned rim 28, so that the seed is caused to rise as it discharges from the periphery of the disk. The rapid revolution of the distributing disk 15 throws the seed by centrifugal force from the periphery of the disk and the blades 16 operate to carry the bulk of seed in a circular path, while the overhanging flanges 17, effectually prevent the seed from rising upwardly over the top edges of the blades, as might be the case if the overhanging flanges were not provided.

The blades 16 extend radially in lines which pass outside the axis of the disk 15, and this renders the action of the disk more efficient and effective in operation, in that it gives a "draft" and serves to more perfectly deliver the seed by centrifugal force.

The bottom edge of the adjustable tubular section 22 of the cut-off is adapted to enter the groove 19 in the circular plate 18, for the purpose of effectually cutting off the supply of seed to the seed distributing disk.

The seed distributing disk may be provided with a vertical agitating arm 29, screwed into or otherwise detachably connected with the plate 18, so that it can be removed if desired. The agitating arm 29 is particularly designed for use when the machine is employed to distribute grass seed or oats, but for many other seed the agitating arm may be removed. When used, the arm 29 moves in a circular path in the tubular cut-off and keeps the seed well stirred up for its effective flow to the seed distributing disk. The vertical shaft 4 is preferably provided with a horizontal agitating arm 30, for stirring the seed in proximity to the tubular cut-off and thus prevent blocking or choking at this point.

The lower end portion of the vertical shaft 4 is supported in a bracket or bearing 31, secured to the hopper or box and extending to the center of the cut-off where the shaft passes through such bracket or bearing.

The overhanging flanges 17 of the blades 16 are very desirable features in that they effectually prevent the seed from rising upward over such blades as the seed is carried out by centrifugal force, and the up-turned rim 28 is desirable in that it gives a rising motion to the seed as it leaves the distributing disk and thus distributes the seed more uniformly.

By moving the handle or lever 25 in one direction, the tubular section 22 is lowered and the quantity of seed delivered to the distributing disk is diminished, while by moving the handle or lever in the opposite direction, the tubular section 22 is raised, and the quantity of seed delivered to the distributing disk is increased.

The pin and slot connection of the telescopic tubular sections 21 and 22 provides a very simple means for adjusting the lower section of the cut-off relatively to the seed distributing disk, but I do not wish to be understood as confining myself to this particular construction, for obviously other means may be employed for adjusting the cut-off to control or regulate at will the quantity of seed delivered to the distributing disk or plate.

The machine described and shown is particularly designed to be carried by a person walking in the field so that one hand can be utilized to turn the handle or crank and thus cause the horizontal distributing disk to rapidly revolve, but I do not confine myself to any particular use of the machine, for obviously it may be supported in any manner suitable for the conditions required, and instead of being carried by a person walking in the field, it may be otherwise carried.

The machine is useful for sowing or distributing seeds of all kind, such as wheat, rye, oats, grass and the like. It may also be used for distributing fertilizing material.

Having thus described my invention, what I claim is—

1. In a broad-cast seeding machine, the combination with a hopper, and a horizontally revolving disk or plate having blades, of a telescopic tubular cut-off extending from the hopper bottom, and having its adjustable tubular section movable vertically to and from the upper surface of the revolving disk or plate to deliver the seed directly from its lower open end upon the central part of said upper surface of the disk or plate, substantially as described.

2. In a broad-cast seeding machine, the combination with a hopper, and a revolving disk or plate having blades, of a telescopic tubular cut-off extending from the hopper bottom, and having its adjustable tubular section movable vertically to and from the upper surface of the revolving disk or plate to deliver the seed directly from its lower open end upon the central part of said upper surface of the disk or plate, a rotary driving shaft extending through the telescopic tubular cut-off and secured to the disk or plate, and gearing housed in the upper part of the hopper for rotating said driving shaft, substantially as described.

3. In a broad-cast seeding machine, the combination with a hopper, of a suspended horizontally revolving disk or plate having rotary blades, and provided at its center with a circular plate interposed between the inner ends of the blades, and a telescopic tubular cut-off extending from the hopper bottom, and having its adjustable tubular section movable vertically to vary the distance between its lower open end and the surface of said circular plate, substantially as described.

4. In a broad-cast seeding machine, the combination with a hopper, and a horizontally-revolving disk or plate, of a cut-off composed of an upper tubular section secured to the hopper, and a lower tubular section adjustable vertically along the length of said upper section, and having a lower open end which delivers the seed directly upon the central part of the revolving disk or plate, substantially as described.

5. In a broad-cast seeding machine, the combination with a hopper or box, of a horizontally revolving distributing disk or plate and a cut-off composed of an upper tubular section secured to the hopper, and a lower tubular section adjustable vertically along the length of said upper section, and having a lower open end which delivers the seed directly upon the central part of the revolving disk or plate, provided with blades extending radially in lines which pass outside the axis of the disk or plate, substantially as described.

6. In a broadcast seeding machine, the combination with a hopper or box, of a horizontally-revolving seed-distributing disk or plate, a cut-off interposed between the latter and the hopper or box, and composed of telescopic tubular sections, one of which slides vertically on the other, and a handle or lever for moving one section vertically to vary the distance between its lower open end and the upper surface of the revolving disk or plate, substantially as described.

7. In a broad-cast seeding machine, the combination with a hopper or box, of a horizontally revolving seed distributing disk provided with an annular groove, a cut-off interposed between the hopper or box and the disk and composed of telescopic tubular sections, the lower one of which is adapted to enter the groove in the seed distributing disk, and a handle or lever for raising and lowering the lower tubular section, substantially as described.

8. In a broad-cast seeding machine, the combination with the hopper or box, and a horizontally revolving seed distributing disk or plate, of an adjustable cut-off provided with telescopic tubular sections which place the hopper or box in communication with the disk or plate, means for adjusting one telescopic tubular section to and from the disk or plate, and a vertical agitating arm carried by the disk or plate and moving in a circular path in the tubular cut-off, substantially as described.

9. In a broad-cast seeding machine, the combination with a hopper or box, and a horizontally revolving seed distributing disk or plate, of a cut-off interposed between the hopper or box and the disk or plate and composed of telescopic tubular sections, one of which is provided with oblique or inclined slots and the other with pins engaging said slots, and a handle or lever for turning one of the tubular sections to move it vertically to and from the upper surface of the revolving disk or plate for varying the distance between said turning section and the disk or plate, substantially as described.

In testimony whereof I have hereunto set my hand in presence of two subscribing witnesses.

CORNELIUS BOLLINGER.

Witnesses:
 ALBERT H. NORRIS,
 JNO. B. HOPPER.